(12) United States Patent
Smith et al.

(10) Patent No.: US 10,773,780 B2
(45) Date of Patent: Sep. 15, 2020

(54) UNMANNED UNDERWATER VEHICLE

(71) Applicant: BAE Systems Information and Electronic Systems Integration Inc., Nashua, NH (US)

(72) Inventors: Jeffrey M. Smith, Pembroke, MA (US); Samuel D. Godin, Fitchburg, MA (US); Leonard M. Baker, Tewksbury, MA (US); Dani Goldberg, New Hyde Park, NY (US); William H. Key, Jr., Marblehead, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/630,552

(22) Filed: Jun. 22, 2017

(65) Prior Publication Data

US 2017/0369137 A1 Dec. 28, 2017

Related U.S. Application Data

(60) Provisional application No. 62/353,085, filed on Jun. 22, 2016, provisional application No. 62/353,091, filed on Jun. 22, 2016.

(51) Int. Cl.
| | | |
|---|---|---|
| *B63G 8/20* | (2006.01) | |
| *B63G 8/26* | (2006.01) | |
| *B63G 8/00* | (2006.01) | |
| *G05D 1/08* | (2006.01) | |

(52) U.S. Cl.
CPC .............. *B63G 8/20* (2013.01); *B63G 8/001* (2013.01); *B63G 8/26* (2013.01); *G05D 1/0875* (2013.01); *B63G 2008/004* (2013.01)

(58) Field of Classification Search
CPC . B63G 8/20; B63G 8/001; B63G 8/26; B63G 2008/004; G05D 1/0875
See application file for complete search history.

(56) References Cited

U.S. PATENT DOCUMENTS

| | | | | |
|---|---|---|---|---|
| 2,906,227 A | * | 9/1959 | Smith ..................... | F42B 19/08 114/20.1 |
| 5,039,032 A | * | 8/1991 | Rudolph ................... | B64C 3/10 244/35 R |
| 5,490,473 A | * | 2/1996 | Chace, Jr. .............. | B63G 8/001 114/330 |
| 8,408,956 B1 | * | 4/2013 | Vosburgh ................ | B63B 22/18 114/312 |
| 8,539,898 B1 | * | 9/2013 | Sylvia ...................... | B63G 8/18 114/312 |
| 9,140,814 B2 | * | 9/2015 | Welker ................. | G01V 1/3843 |

(Continued)

FOREIGN PATENT DOCUMENTS

CN 201842228 * 5/2011 ............. B63B 49/00

OTHER PUBLICATIONS

CN 201842228 (Year: 2011).*

*Primary Examiner* — Anthony D Wiest
(74) *Attorney, Agent, or Firm* — Schmeiser Olson & Watts LLP; James Murphy; Scott J. Asmus

(57) ABSTRACT

An unmanned underwater vehicle having one, some, or all of an integrated communication control fin, a ballast and trim control, a reusable trigger mechanism for a drop weight, and a visual hull display. Furthermore, associated methods are also provided.

16 Claims, 16 Drawing Sheets

(56) References Cited

U.S. PATENT DOCUMENTS

| | | | | |
|---|---|---|---|---|
| 2005/0109259 A1* | 5/2005 | August | ........... | B63G 8/001 |
| | | | | 114/312 |
| 2007/0203623 A1* | 8/2007 | Saunders | ........... | G05D 1/0206 |
| | | | | 701/23 |
| 2010/0226204 A1* | 9/2010 | Gagliardi | ........... | G01V 1/38 |
| | | | | 367/16 |
| 2012/0118218 A1* | 5/2012 | Shen | ........... | B60K 3/00 |
| | | | | 114/331 |
| 2013/0206419 A1* | 8/2013 | Hallundbaek | ........... | E21B 33/06 |
| | | | | 166/341 |
| 2015/0177212 A1* | 6/2015 | Thomas | ........... | E02D 1/00 |
| | | | | 114/331 |
| 2015/0336650 A1* | 11/2015 | Fenu | ........... | B63H 25/02 |
| | | | | 114/315 |
| 2016/0229503 A1* | 8/2016 | Sheard | ........... | B63G 8/22 |

* cited by examiner

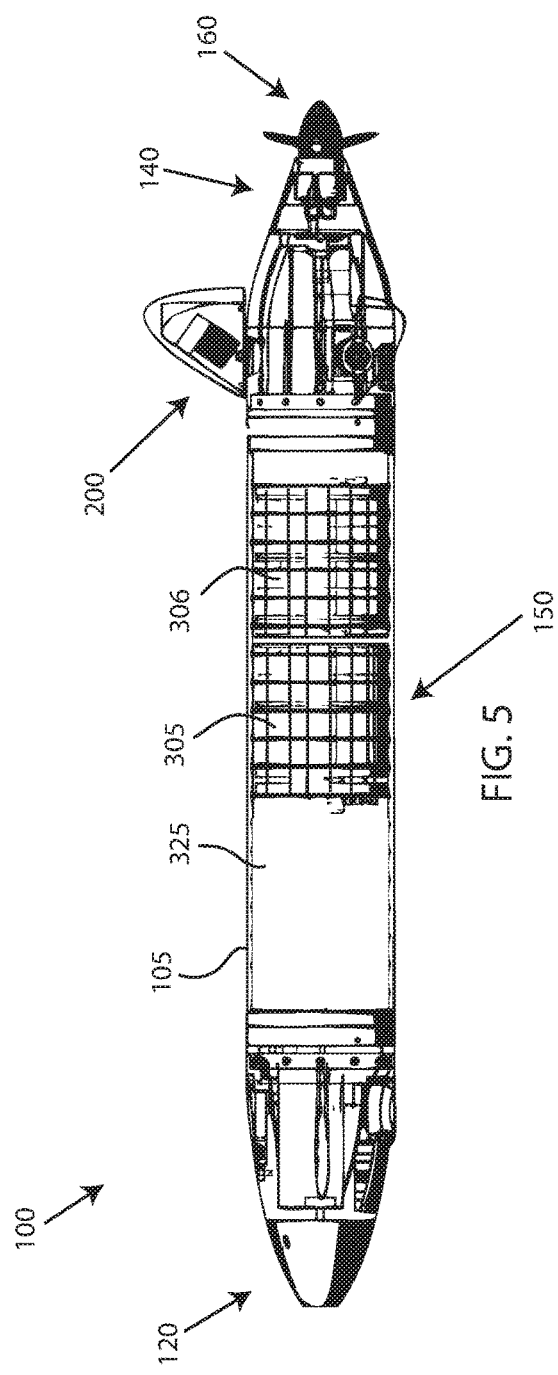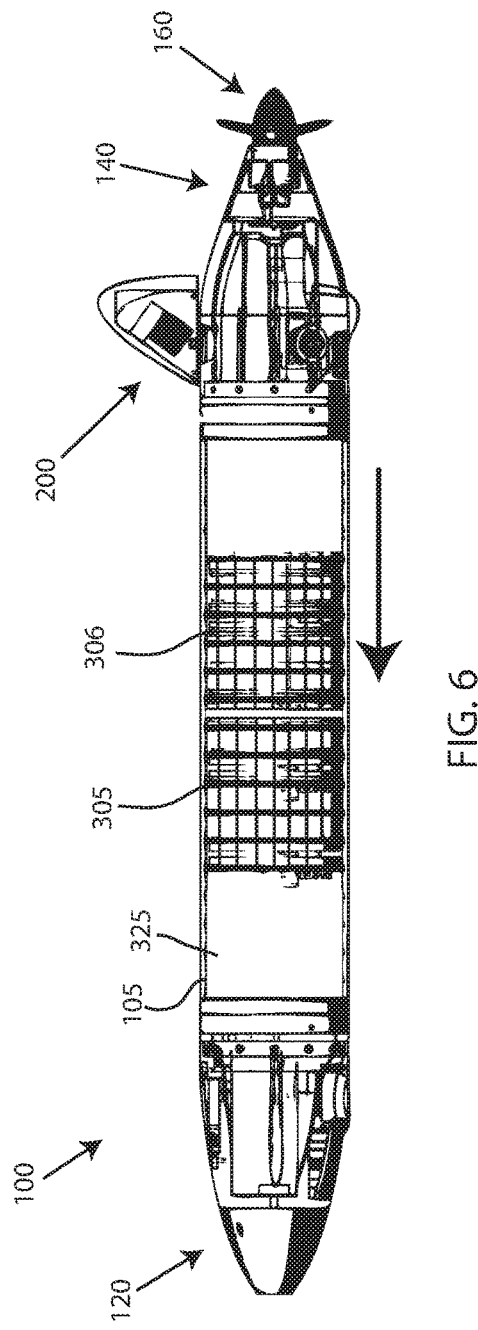
FIG. 5
FIG. 6

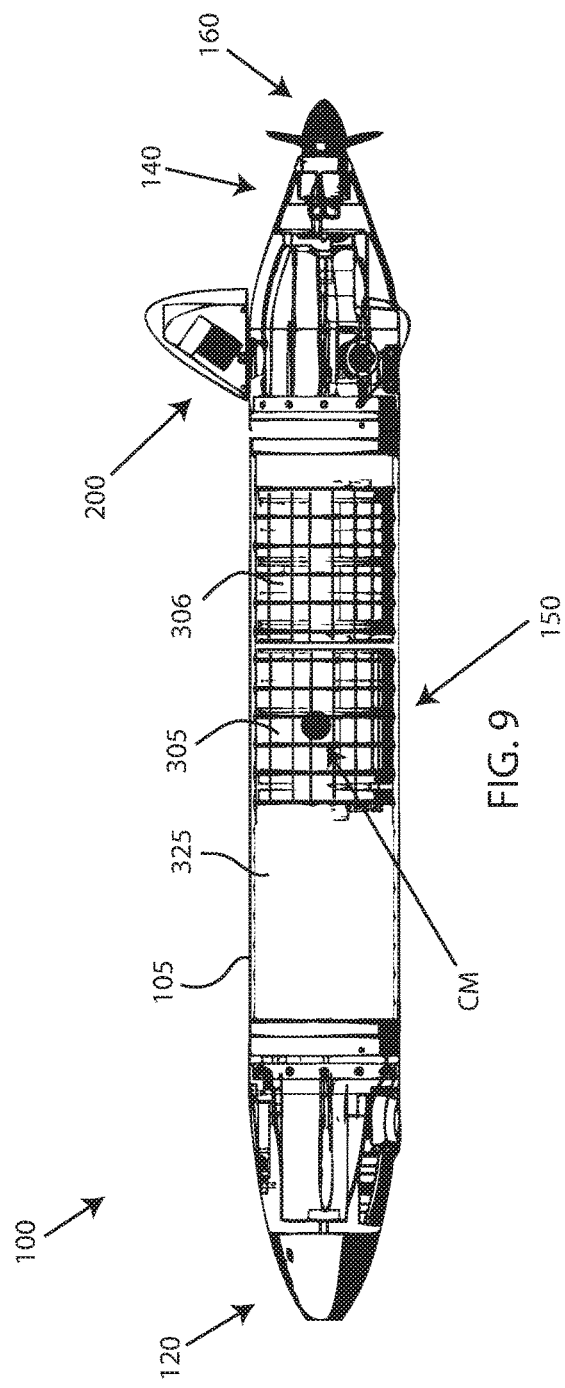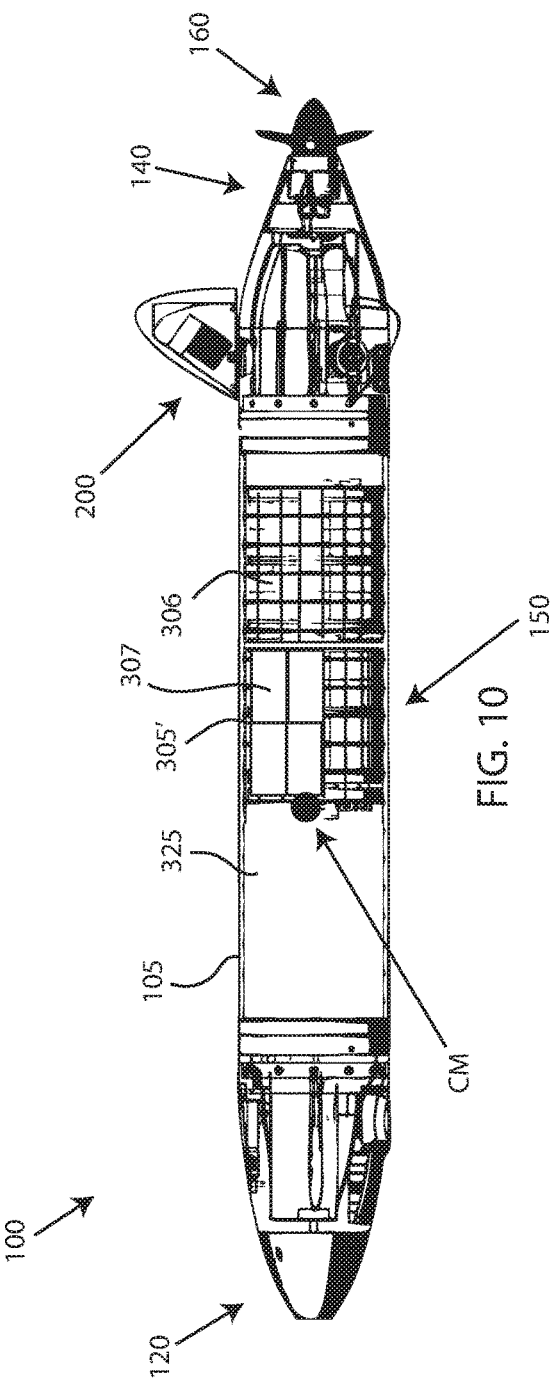

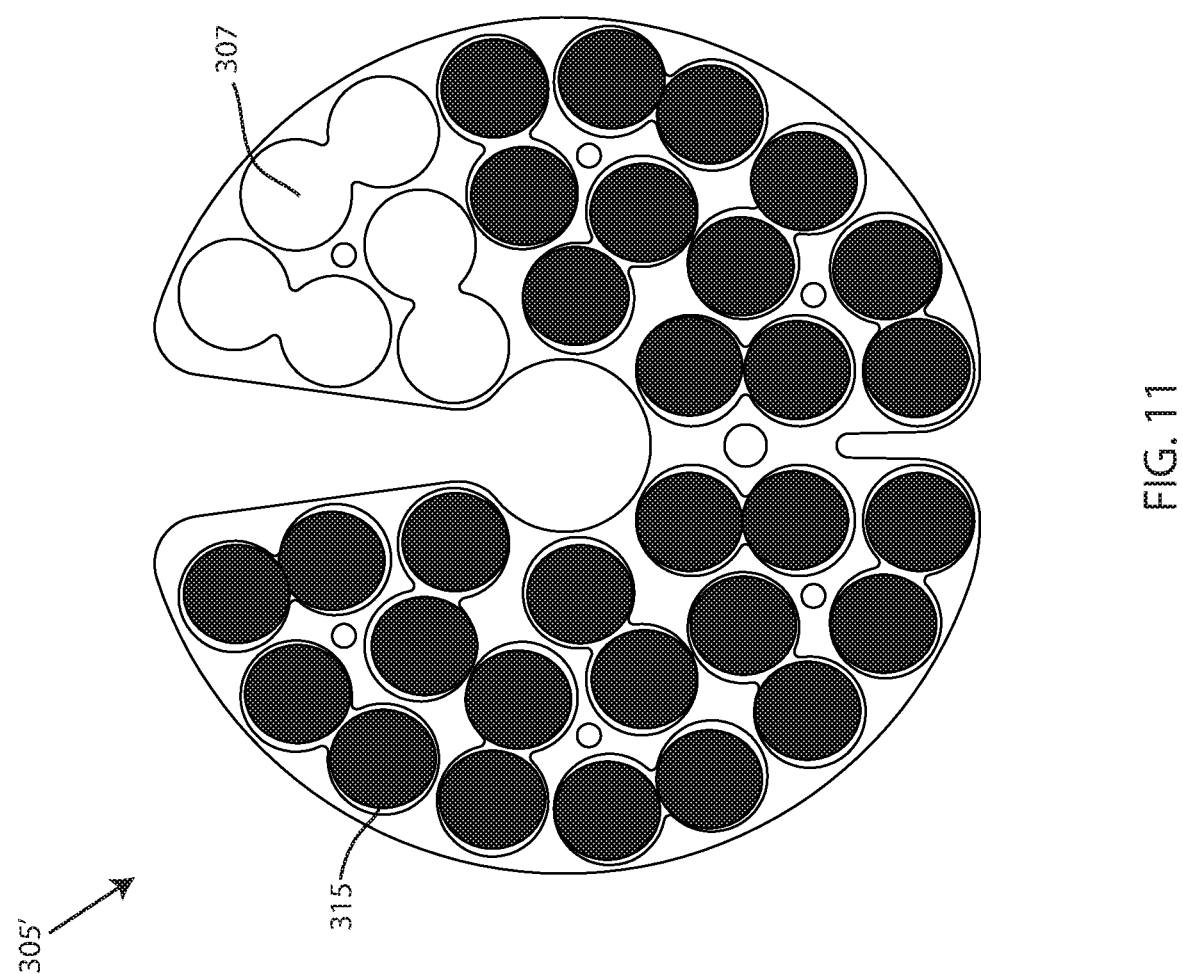

UNMANNED UNDERWATER VEHICLE

CROSS-REFERENCE TO RELATED APPLICATIONS

This application claims priority to and the benefit of U.S. Provisional Application No. 62/353,085, filed Jun. 22, 2016, and entitled, "Underwater Unmanned Vehicle," and U.S. Provisional Application No. 62/353,091, filed Jun. 22, 2016, and entitled, "Visual Display For Hull of an Underwater Unmanned Vehicle." The entire contents of U.S. Provisional Application No. 62/353,085 and U.S. Provisional Application No. 62/353,091 are hereby incorporated by reference.

FIELD OF TECHNOLOGY

The following relates to an unmanned underwater vehicle, and more specifically to embodiments of an unmanned underwater vehicle having an integrated communication control fin, ballast and trim control, a reusable triggering mechanism for a drop weight, and a visual display integrated into the hull.

BACKGROUND

Autonomous Underwater Vehicles (AUVs) and Unmanned Underwater Vehicles (UUVs) can be used for a variety of commercial and research applications as well as military applications.

SUMMARY

A first aspect relates generally to an unmanned underwater vehicle (UUV) comprising: a hull having a nose and a tail, a propulsion mechanism, and a control fin, the control fin housing at least one antenna, wherein the control fin is configured to control a movement of the UUV and communicate external to the UUV.

A second aspect relates generally to an unmanned underwater vehicle (UUV) comprising a hull having a nose portion and a tail portion, a propulsion mechanism, and one or more movable battery modules disposed within an interior region of the hull, wherein displacement of the one or more battery modules in an axial direction within the hull affects a trim of the UUV.

A third aspect relates generally to an unmanned underwater vehicle (UUV) comprising: a hull having a nose portion and a tail portion, a propulsion mechanism, and one or more movable battery modules disposed within an interior region of the hull, wherein rotation of the one or more battery modules counters a tendency for the UUV to roll, in response to an offset to a balance of the UUV.

A fourth aspect relates generally to an unmanned underwater vehicle (UUV) comprising: a nose portion, a reusable trigger mechanism disposed on an underside of the nose portion, the reusable trigger mechanism having a trigger magnet, a drop weight magnetically attached to the trigger magnetic, the drop weight including a drop weight magnet magnetically attracted to the trigger magnet, wherein, in response to an event, a power is applied to the trigger magnet to create an opposing magnetic field which overcomes the magnetic attraction between the trigger magnet and the drop weight magnet, causing the drop weight to disengage from the UUV, so that the UUV immediately begins to surface.

A fifth aspect relates generally to a method for eliminating a communication mast on an outer surface of an unmanned underwater vehicle (UUV), and integrating communications and navigational hardware into a control fin of the UUV, so that the control fin controls a travel direction of the UUV and communicates with an external computing system.

A sixth aspect relates generally to a method for adjusting a trim of an unmanned underwater vehicle (UUV), comprising disposing one or more battery modules in an interior region of a hull of the UUV, and displacing at least one of the one or more battery modules to affect the trim of the UUV.

A seventh aspect relates generally to a method for countering a roll of an unmanned underwater vehicle, comprising disposing one or more battery modules in an interior region of a hull of the UUV, and rotating at least one of the one or more battery modules to counter the roll of the UUV.

An eight aspect relates generally to a UUV having one or more of the aspects listed above.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 5 depicts a side view having a sectional cut-away view of an interior of the UUV having one or more battery modules in a first position, in accordance with embodiments of the present invention;

FIG. 6 depicts a side view having a sectional cut-away view of an interior of the UUV having one or more battery modules in a second position, in accordance with embodiments of the present invention;

FIG. 9 depicts a side view having a sectional cut-away view of an interior of the UUV having a one or more battery modules in a first position within the UUV, and an initial center of mass, in accordance with embodiments of the present invention;

FIG. 10 depicts a side view having a sectional cut-away view of an interior of the UUV having a one or more battery modules in a second position within the UUV, and a new center of mass, in accordance with embodiments of the present invention;

FIG. 11 depicts an end view of a battery module, wherein one or more batteries are removed from the module, in accordance with embodiments of the present invention;

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
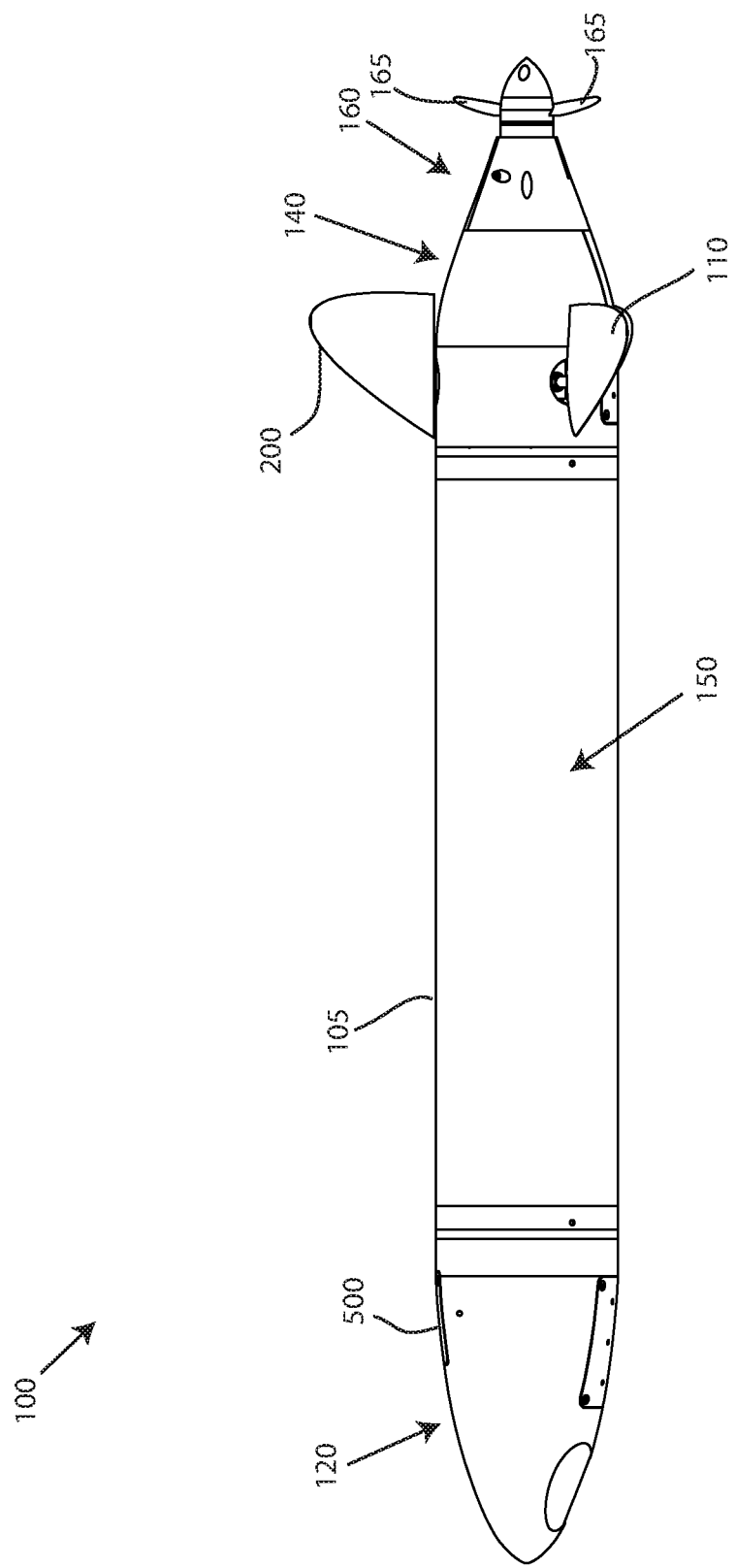
FIG. 1 depicts a side view of an unmanned underwater vehicle (UUV), in accordance with embodiments of the present invention.

Referring to the drawings, FIG. 1 depicts an embodiment of an unmanned underwater vehicle (UUV) 100. The term UUV 100 may be used interchangeably with autonomous underwater vehicle (AUV), wherein the use of the terms UUV and AUV may depend on the application (e.g. military application vs. research application) or intended use of the vehicle 100. For clarity, the term UUV will be used throughout the description. Embodiments of the UUV 100 may be an undersea vehicle, an unmanned undersea vehicle, an unmanned submersible, an autonomous undersea vehicle, a robotic submersible, a robotic vehicle for undersea applications, and the like. Embodiments of the UUV 100 may function autonomously for operations below a surface of a body of water, such as a lake, river, ocean, etc. Various operations of the UUV 100 may include but not limited to mapping ocean floors, investigating objects located undersea, reconnaissance, imaging, mine countermeasures, object detection, oil and gas undersea exploration, underwater surveying, ocean research, academic research, underwater package or payload delivery, military missions, undersea communications, intelligence operations, and the like.

Embodiments of the UUV 100 may include, a nose 120, a hull 150, a tail 140, and a propulsion mechanism 160 proximate the tail 140. The nose 140 or nose portion 140 may be separable from the hull 150 or hull portion 150, and the tail 140 or tail portion 140 may be likewise separable from the hull 150. The separation of the nose 120 and/or tail 140 may be used for accessing an interior of the hull portion 150, or interior regions of the nose 120 and tail 140. The connection between the nose portion 120, hull 150, and tail portion 150 may be watertight connections. In some instances, a flooded or "wet" hull portion may be created by dividing hull 150 into a wet and a dry section separated by a watertight bulkhead. In an operable position, such as a fully assembled position capable of underwater application, the UUV 100 may have an outer surface 105. The outer surface 105 may be a continuous or uniform surface comprising an external surface or outer body portion of the UUV 100. In an exemplary embodiment, the nose 120 and tail section 140 may be pushed into a center section and in some configurations with a wet and a dry center section, the wet section can be pushed onto a mating face on the dry section and set screws may be screwed into holes threaded into the wet side of the O-ring seal on both the nose and tail mating rings as well as the dry section mating ring of the center section, should that configuration be used. Embodiments of the UUV 100 may further include a plurality of fins 110 proximate a tail portion 140 of the UUV 100. The fins 100 may be used to control a movement or movement direction, angle, etc. The fins 110 may be a fin or a rudder. Embodiments of the propulsion mechanism 160 may be comprised of a plurality of propellers 165.

Embodiments of the UUV 100 may include a plurality of sensors, cameras, communications hardware, lights, gauges, hardware, interfaces, and the like. For instance, embodiments of the UUV 100 may include an altimeter (e.g. 300 foot altimeter), a pressure sensor (e.g. 30 Bar Pressure Sensor), a temperature sensor, one or more IR LED strobes, white LED strobes, WiFi capability, and GPS technology. Moreover, embodiments of the UUV 100 may include a plurality of hardware and interfaces, such as an inertial measurement unit (IMU), an altimeter, a pressure sensor, an OLED display, an autonomy controller, payload, power controller, a plurality of servo motors, a tail controller, a GPS antenna, a Wi-Fi chip, a plurality of LED's, an ESC, and a motor.

Embodiments of the UUV 100 may be powered by different energy sources. In an exemplary embodiment, the UUV 100 is powered by one or more batteries located onboard the UUV 100. In an exemplary embodiment, a power source for the UUV 100 may include one or more battery modules located within an interior region of the hull 150, wherein each battery module includes a plurality of removable batteries (e.g. AA, AAA, C, D batteries) inserted into cavities of the battery module. Embodiments of various energy sources may include alkaline, lithium ion (rechargeable), lithium ion (primary), Nickel metal hydride (NiMH) (rechargeable), Nickel Cadimum (NiCad) (rechargeable) and optional power sources, such as an Aluminum Sea Water battery or other fuel cell embodiments. Each power source design may be associated with a predicted endurance. In an embodiment of the UUV 100 having an alkaline battery as a power source, a predicted endurance may be 30 hours. In an embodiment of the UUV 100 having a rechargeable lithium ion battery as a power source, a predicted endurance may be 48 hours. In an embodiment of the UUV 100 having a primary lithium ion battery as a power source, a predicted endurance may be 144 hours. In an embodiment of the UUV 100 using an Aluminum Sea Water battery as a power source, a predicted endurance may be 400 hours. The predicted endurance associated with the various power sources/energy options listed herein are exemplary; the maximum endurance achievable for the UUV 100 may not be limited to the examples provided herein, and may be increased or decreased depending on the particular specifications and design of the power source associated with the UUV 100.

Furthermore, embodiments of the UUV 100 may include a computing system. The computing system may be a computer having at least one processor, located onboard the UUV 100. The computing system may be coupled to the GPS unit(s) and the WiFi network controllers, for example, a direct interface with the computing system via printed wiring board (PWBs). Embodiments of the computing system of the UUV 100 may require software and may utilize proprietary or open source software for application and programming. In an exemplary embodiment, the UUV 100 may include a BeagleBone Black or similar capability computer running various software, such as MOOS-IvP, which may provide a well-supported, cost effective, power conscious hardware environment for UUV applications. These software applications may interface to the hardware devices of the UUV 100 through a nose controller, power controller, and/or tail controller using appropriate communications protocol (e.g. via I2C). As an example, low power Arduino Pro Micros may handle unique interface needs to hardware located in respective compartments of the UUV 100. Further, a flexible payload configuration with a range of standard communication protocols as supported by the BeagleBone Black such as RS-232, USB, I2C, SPI, and Ethernet, may be used.

Embodiments of the UUV 100 may be a small, yet capable platform suited for a host of applications from development to full mission. Embodiments of the UUV 100 may have a length from nose to tail of five feet or less, and may be capable of carrying out operations at 300 m depths. In one embodiment, the UUV 100 may have a length five feet or less and capable of carrying out underwater operations deeper than 100 m from a water surface. In an exemplary embodiment, the UUV 100 may be 33.5 inches in length, weigh 19 lbs, 200 m rated, and have a diameter of 4⅞ inches. In other embodiments, the UUV may be greater or less than 33.5 inches in length, weigh greater or less than 19 lbs, and may have a diameter greater or less than 4⅞ inches, depending on the various design specifications and power source requirements. For instance, embodiments of the UUV 100 may be smaller than traditional or conventional UUVs, and may be referred to as a Micro-UUV™ or μUUV™. In other embodiments, the UUV 100 may be the size of larger, conventional UUVs, and utilize a same or similar electronics, software and general physical configuration. Moreover, embodiments of the UUV 100 may be comprised of a mixed material that forms a reliable seal for underwater applications. For instance, embodiments of the nose portion 120 and the tail portion 140 may be made of a 3D printed nylon, while the hull 150 (e.g. center body portion) may be comprised of carbon fiber. In some embodiments, the UUV 100 may be comprised of carbon fiber, 3D printed nylon, and/or a combination thereof. Alternately, for use at deep depths to 6000 meters, the UUV 100 may be comprised of 3D printed metal, including aluminum and titanium. Further, embodiments of the UUV 100 may utilize joining rings on the nose and tail as well as on a dry center section where the dry section joins a wet section having two O ring grooves.

Figure 2:
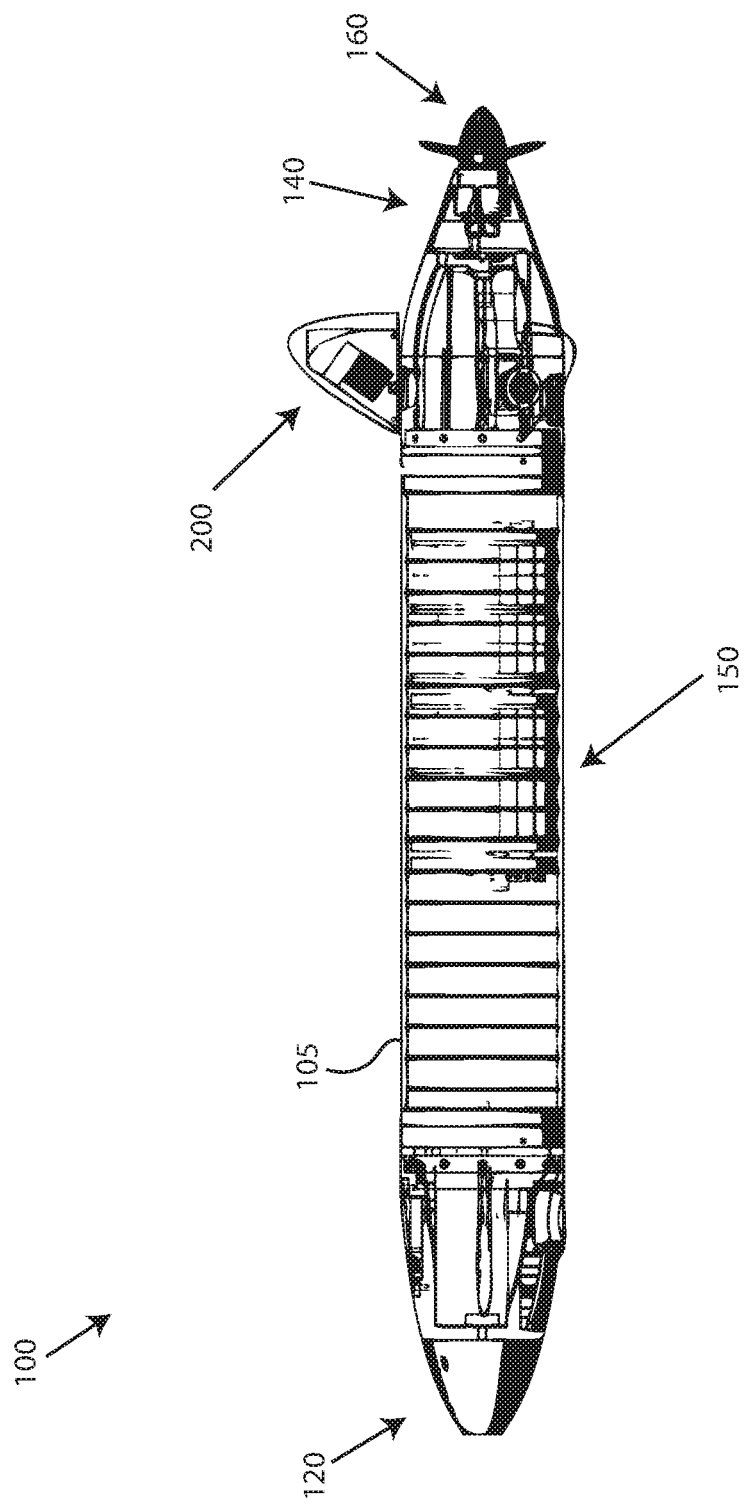
FIG. 2 depicts a side view having a sectional cut-away view of an interior of the UUV having a control fin with integrated communication hardware, in accordance with embodiments of the present invention.
Figure 3:
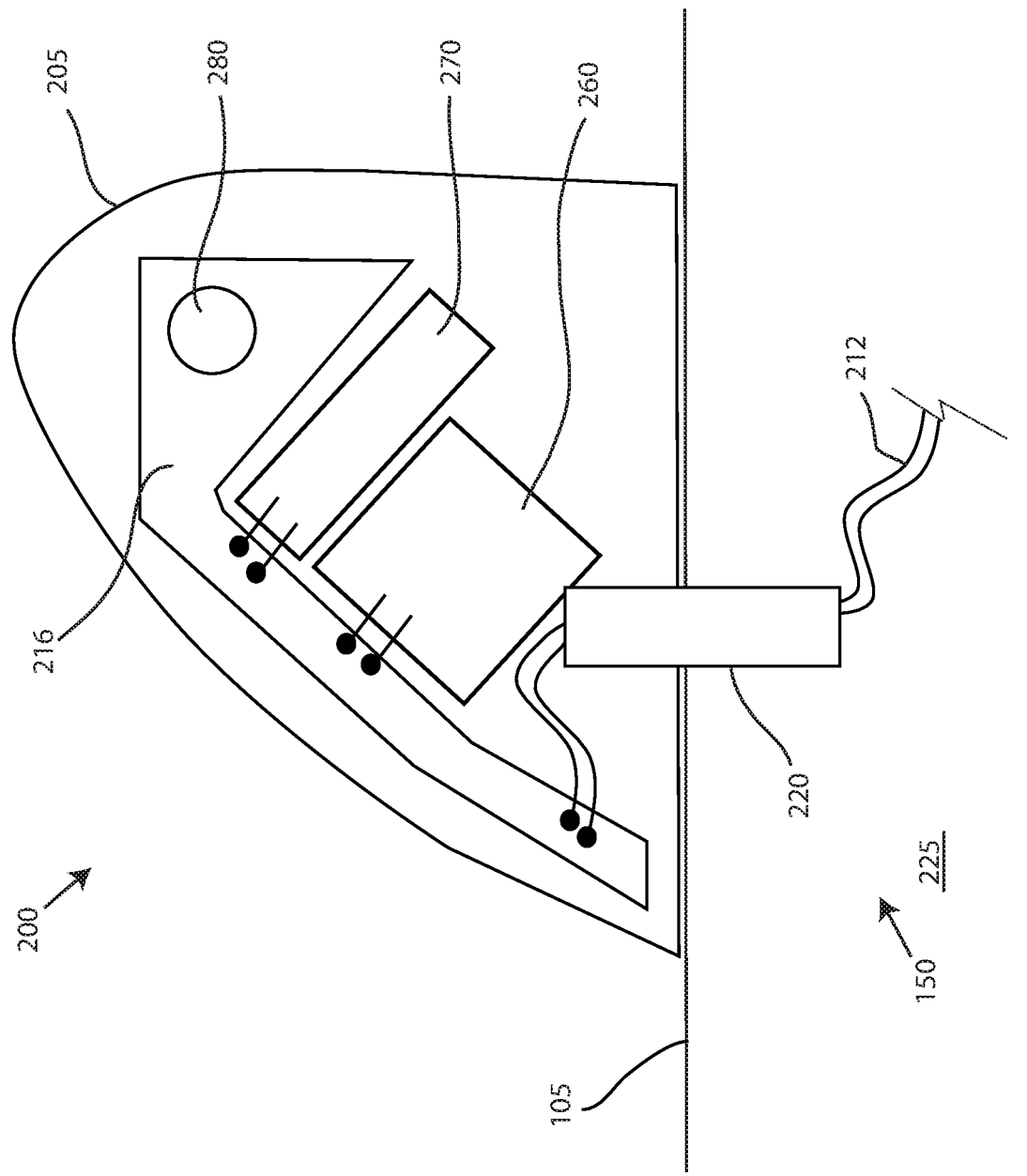
FIG. 3 depicts a schematic view of the control fin, in accordance with embodiments of the present invention.

Referring now to FIG. 2, embodiments of the UUV 100 may include an integrated communication control fin 200. In a typical UUV, external interface communications and navigation functions are provided through the use of a communications mast. The communication mast is typically installed on the UUV ahead of (e.g. closer to the nose of the vehicle) the control fins on a body of the vehicle, and creates significant hydrodynamic drag effects because the mast protrudes from the body of the vehicle. Embodiments of the UUV 100 eliminate the communication mast to significantly decrease hydrodynamic drag and increase endurance and top speed. To eliminate the mast, the external communications and navigation functions normally contained or comprised as part of the mast are relocated and integrated with one of the fins 110 of the UUV 100. In particular, a control fin 200 of the UUV 100 may be integrated with hardware, such as a circuit board 216, GPS antenna 260, a WiFi antenna 270, and a recovery strobe 280 (e.g. LED), as shown in FIG. 3. In an exemplary embodiment, the integrated communications control fin 200 may be the dorsal (i.e. top) control fin. Embodiments of the integrated communications control fin 200 may be an integrated antenna/control fin or rudder that may contain all (or less than all in some embodiments) of the external communications and external navigation functions, eliminating any communications masts or other external devices installed on the vehicle to enable external communications. The control fin 200 may be a vertical fin or rudder, wherein the vertical control fin 200 may protrude above the water when the UUV 100 is surfaced (or located just below the water surface) for communication and reception. The elimination of the conventional, communications masts or external devices may significantly increase endurance (i.e. range) and a top speed through a reduction in hydrodynamic drag. Further, by relocating the communication hardware to the fin 200, the UUV 100 utilizes a same component (i.e. fin 200) for communications, navigation functions, and directional control of the vehicle 100.

Figure 4:
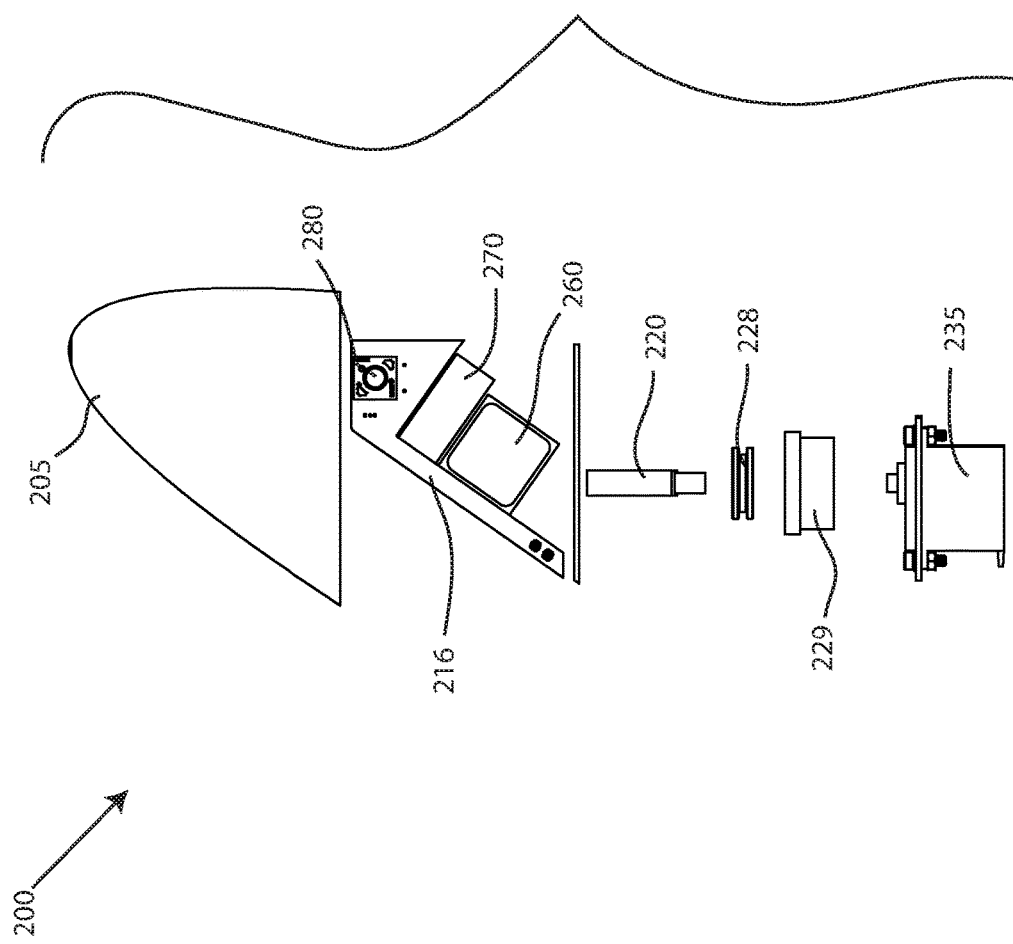
FIG. 4 depicts an assembly view of the control fin and a connection portion, in accordance with embodiments of the present invention.

With reference to FIGS. 3 and 4, all or some of the wires, the antennas 260, 270, and strobe light 280 in the integrated communications control fin 200 may be housed or otherwise contained within a mold 205 that forms the fin 200. The wires 212 linking the antennas 260, 270 may be routed into a control fin actuator shaft 220 which brings the wires 212 into a watertight enclose 225 of the hull 150 of the UUV 100. For instance, when the control fin 200 is constructed or otherwise made operable with the UUV 100, the interconnecting wires 212 may be routed into the shaft 220 connecting the control fin 200 with a servo actuator 235 located inside the watertight enclosure 225 of the hull 150. Inside the hull 150 and just before the shaft 220 is inserted into the actuator 235, the wires 212 may be routed out of the shaft 220 through an opening in the shaft 220, and because the shaft 220 may, in most embodiments, never be turned, titled, or rotated more than 90 degrees in either direction, there is no requirement for a slip ring. The wires 212 may then be connected to the appropriate electronics cards as required for function.

FIG. 4 depicts an assembly of components relating to the communications fin 200, which connect the control fin 200 to a servo 235 located within an interior region of the hull 150. Embodiments of the shaft 220, which has a generally axial opening therethrough, may receive the wires 212. The shaft 220 may pass through a generally axial opening of a seal member 228 and a seal holder 229 and make eventual engagement with the servo 235. The seal member 228 may rest within the seal holder 229, wherein the seal 228 and the seal holder 229 may be pressed fit together and disposed proximate the outer surface 105 of the UUV 100.

In an exemplary embodiment, the control fin 200 may be integrated with the communications and navigation hardware by being potted in the mold 205, upside down. For instance, prior to pouring of the potting, one or more antennas 260, 270 with associated control wires and the actuator shaft 220 are appropriately suspended in the mold 205 so that the potting material encapsulates the assembly. Also, prior to pouring of the potting material, the antenna wires may be routed into the actuator shaft 220 and brought out of an opening cut in the actuator shaft 220 near a bottom of the shaft 220. After potting, the wiring 212 and actuator shaft 220 can be inserted into the hull 150 of the UUV 100 through an appropriate hull shaft seal 228 to retain water tightness of the hull 150. Once the actuator shaft 220 is inserted into the hull 150, the connecting wires 212 may be routed to the appropriate electronic circuit boards positioned within and around various portions of the UUV 100.

Referring now to FIGS. 5-6, embodiments of the UUV 100 may be adjusted and tuned for trim. Embodiments of the trim adjustment of UUV 100 may include displacing one or more battery modules 305, 306 within an interior region 325 of the hull 150 of the UUV 100, in an axial direction (e.g. fore and aft). Execution of a proper ballast and trim is ideal for proper operation of the UUV 100. Typically, the vehicle 100 can be ballasted to be neutral or slightly positive in the water and trimmed fore and aft for proper trim, characteristics which vary with the density of the water the vehicle is operating in, but which are essential for operation of the vehicle. If the vehicle is properly trimmed fore and aft, the vehicle can traverse (or "fly") through the water without supplemental trim forces introduced by the control fins. Any overuse or unnecessary use of the control fins introduces undesirable drag, which reduces vehicle endurance and top speed.

Embodiments of the UUV 100 may include one or more moveable battery modules 305, 306 located within the interior region 325 of the hull 150, which may be displaced either towards the nose 120 or towards the tail 140, depending on a desired trim adjustment. Embodiments of the battery modules 305, 306 may be a battery unit, a module, a battery sleeve, a battery holder, and battery module, and the like. The battery modules 305, 306 may include a plurality of cylindrical cavities to removably accept a battery, as described in greater detail infra. FIG. 5 depicts a first position, wherein the battery modules 305, 306 are closer to the tail portion 140 of the UUV 100. To adjust a trim of the UUV 100, the battery modules 305, 306 may be moved, slid, displaced, driven, or otherwise relocated to a different axial location within the hull 150 of the UUV 100. FIG. 6 depicts a second position, wherein the battery modules 305, 306 have been moved within the hull 150 to adjust a trim of the UUV 100. In the second position, the battery modules 305, 306 have been displaced in a direction toward the nose 120 (indicated by the arrow), such that the battery modules 305, 306 are located in a different axial location within the hull 150. The battery module(s) 305, 306 can be manually moved fore and aft in a center payload section to counter internal or external loads fore and aft trim variances introduced by payload sensors or manufacturing issues. For instance, while the vehicle 100 is on deck or out of the water, a user may access the interior region 325 of the hull 150, and may slide, move, displace, relocate, etc. one or both of the battery modules 305, 306 to adjust a trim of the vehicle 100. The trim may be affected and/or adjusted by the various positions of the battery modules 305, 306, which is typically the heaviest object/component of the UUV 100, because a weight of the batteries closer to a nose 120 may urge the nose 120 downward, while a weight of the batteries closer to the tail 140 may urge the nose upward 140. Accordingly, because the battery modules 305, 306 are moveable within the interior region 325 of the hull 150 of the UUV 100, a trim may be adjusted to accommodate various offsets.

Once the battery is manually moved to the proper position fore and aft, each battery module 305, 306 may be locked or otherwise secured in place. The battery modules 305, 306 may be secured in an axial position within the hull 150 with a use of retaining rings, or snap rings, placed ahead and behind the battery module 305. The retaining rings may be disposed into concentric grooves cut into an inner wall of the center payload section of the hull 150 as appropriate to retain the battery in the desired position. Embodiments of the battery module 305, 306 may have a corresponding groove that accommodates or receives a portion of the retaining ring. Alternatively, a face of the battery modules 305, 306 may abut or engage the retaining ring to securably locate the battery module 305, 306 within the interior region 325 of the hull. The retaining rings may allow for rotation of the battery modules 305, 306 but prevent axial movement of the battery modules 305, 306 within the hull 150.

Figure 7:
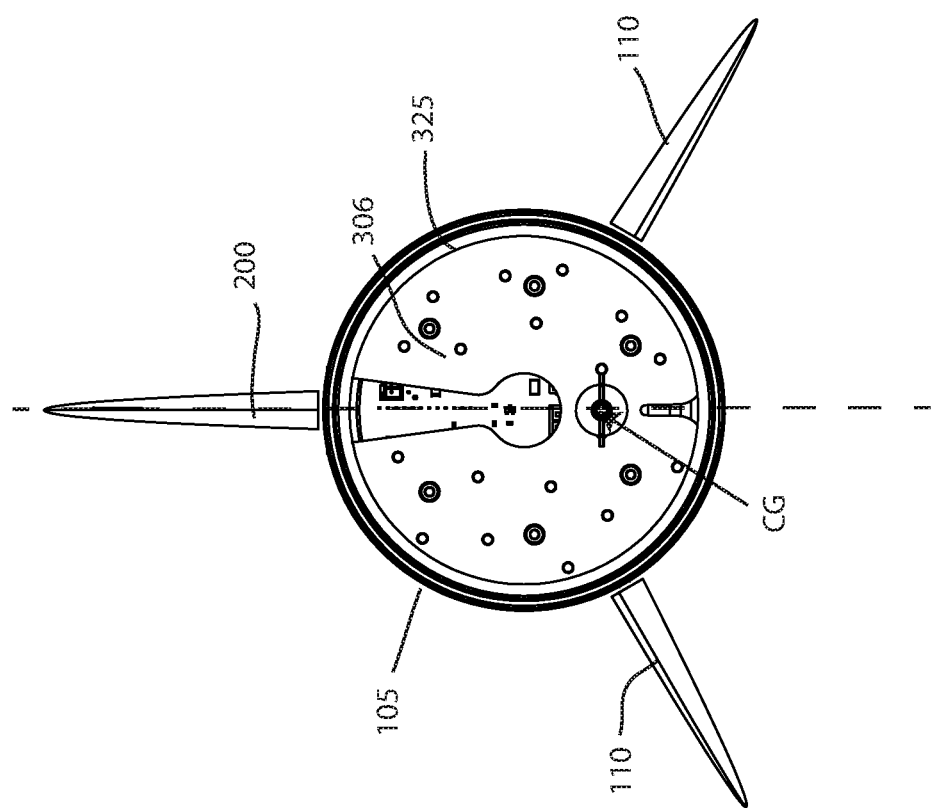
FIG. 7 depicts an end view, cross-section showing a battery module in an initial position having an initial center of gravity, in accordance with embodiments of the present invention.
Figure 8A:
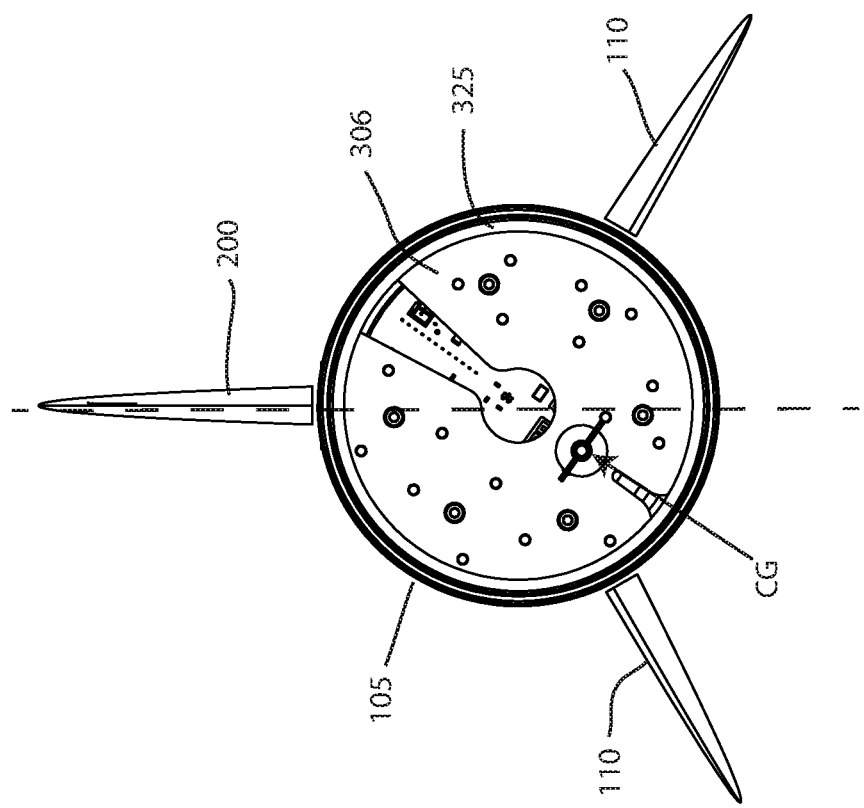
FIG. 8A depicts an end view, cross-section showing a battery module in a rotated position, in a first direction, having a changed center of gravity, in accordance with embodiments of the present invention.
Figure 8B:
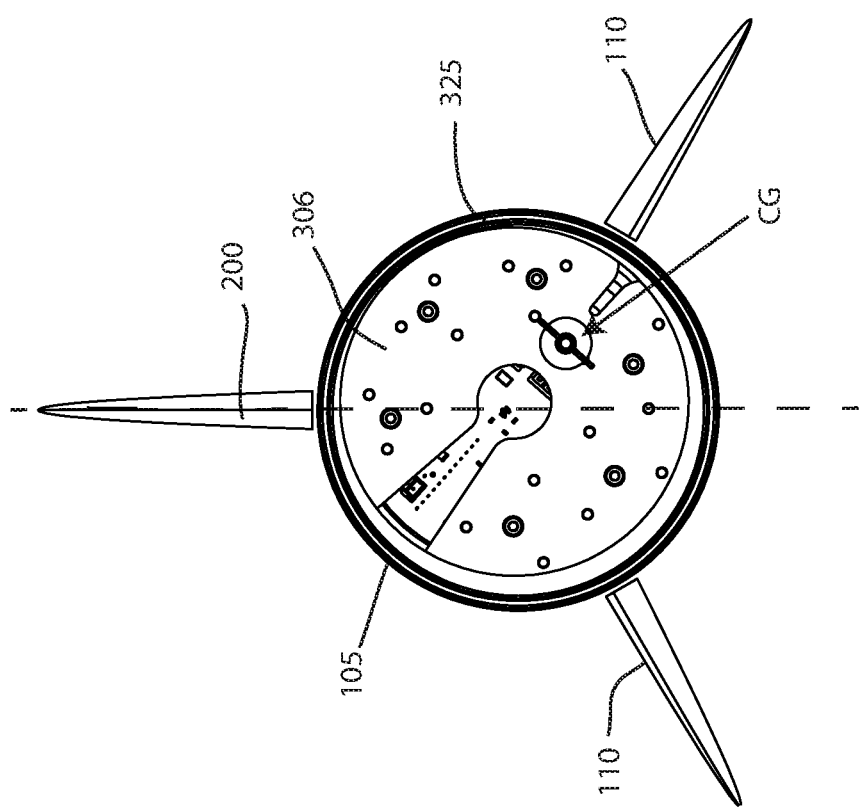
FIG. 8B depicts an end view, cross-section showing a battery module in a rotated position, in a second direction, having a changed center of gravity, in accordance with embodiments of the present invention.

Turning to FIGS. 7-8B, embodiments of the UUV 100 may account for and/or counter a roll caused by various, offsets, etc. of the vehicle 100. For example, any rotational variations introduced by eccentric payload or manufacturing variances can be countered by manipulating the battery modules 305, 306 by rotating the battery modules 305, 306 within the interior region 325 of the hull 150. As shown in FIG. 7, the battery modules 305, 306 have been designed to place the center of gravity CG below a rotational center of the battery module 305, 306. Thus, a rotation of the battery module 305, 306 can cause an associated rotational displacement of the battery center of gravity CG. Because the battery modules 305, 306 account for the largest mass in the vehicle 100, a change in the battery module center of gravity CG can have a significant effect on the trim of the UUV 100.

Due to the placement and temporary securement of the battery modules 305, 306 within the hull 150 using the retaining rings that allow for rotational movement, the battery modules 305, 306 may be rotated (e.g. manually rotated) within the hull 150 to change a center of gravity of the batteries CG. FIG. 8A depicts a change in battery center of gravity CG, in response to a rotation in a first direction. The battery center of gravity CG shown in FIG. 8A after a rotation in the first direction is different than the original battery center of gravity CG shown in FIG. 7, prior to a rotation of the battery. Likewise, FIG. 8B depicts a change in battery center of gravity CG, in response to a rotation in a second, opposing direction. The battery center of gravity CG shown in FIG. 8B after a rotation in the second direction is different than the original battery center of gravity CG shown in FIG. 7, prior to a rotation of the battery. The battery modules 305, 306 may remain in a rotated position due to an interference fit or friction between an outer radial surface of the battery module 305, 306 and an inner surface inside the hull 150. For example, a force required to turn or rotate the battery modules 305, 306 may be greater than a friction force acting upon the battery module 305, 306, but the friction force may be greater than a gravitational force urging the modules 305, 306 back into an original position. In an alternative embodiment, the battery modules 305, 306 may be locked or otherwise secured in place using one or more pins that extend from the inner surface inside the hull 150 and engages the battery module 305, 306, or other mechanical fastener combination or mechanical engagement.

Referring now to FIGS. 9-11, embodiments of the UUV 100 may be adjusted and tuned for ballast. Embodiments of the ballast adjustment of UUV 100 may involve a manipulating of a weight of one or more of the battery modules 305, 306. To achieve a correct ballast for floating the vehicle 100 slightly positive in any density water, the battery module 305, 306 has been designed to permit operations with a varying number of battery cells with a number of battery cells selected to optimize vehicle buoyancy. In an exemplary embodiment, the battery module 305, 306 may accept up to 72 AA sized primary and rechargeable battery cells in one battery module. When the battery module 305, 306 includes a maximum number of battery cells, an initial center of mass CM is in a first location with respect to the UUV 100, as shown in FIG. 9. However, the vehicle 100 may operate with a fewer number of battery cells to permit a reduction in weight of the battery module(s), permitting an adjustment of a buoyancy through reduction in battery module weight. FIG. 10 depicts an embodiment of UUV 100 having a plurality of battery cells removed from a battery module 305', leaving a plurality of empty battery slots 307. In FIG. 10, due to a weight reduction of the battery module 305', the center of mass CM has changed (e.g. the center of mass is now closer to the nose 120). Likewise, the center of gravity moves aft, which can affect the trim of the vehicle 100. FIG. 11 depicts an end view of an embodiment of a battery module 305', which shows a plurality of empty battery slots 307, and a plurality of individual battery cells 315 disposed within slots of the batter module 305'. Accordingly, as an example, while the UUV 100 is on deck or out of the water, a user may access the interior region 325 of the hull 150, and may remove one or more individual battery cells 315 from one or both of the battery modules 305, 306 to adjust or otherwise affect a ballast of the vehicle 100. Further, removing a plurality of battery cells 315 from the battery module 305' in a particular location, such as shown in FIG. 11, may also be effective in inducing a roll to counter a tendency for the vehicle 100 to roll during travel.

Additional weight reduction and weight addition techniques may be employed. For example, one or more small weights, such as a metal washer, may be stacked, placed within, disposed, or otherwise provided in a cavity located on an underside of the hull 150 proximate a tail portion 140 and/or proximate the nose portion 120. The weighted objects may fit within one or more receptacles placed next to each other, wherein a cover may retain or cover the weighted objects placed within the receptacles (see cover 111 in FIG. 12). Embodiments of the receptacles may be an opening, a bore, a cavity, a receptacle, a void, and the like, that extends inwardly into the hull 150 of the UUV, so as to accept a stack of one or more weighted objects underneath the cover.

Figure 12:
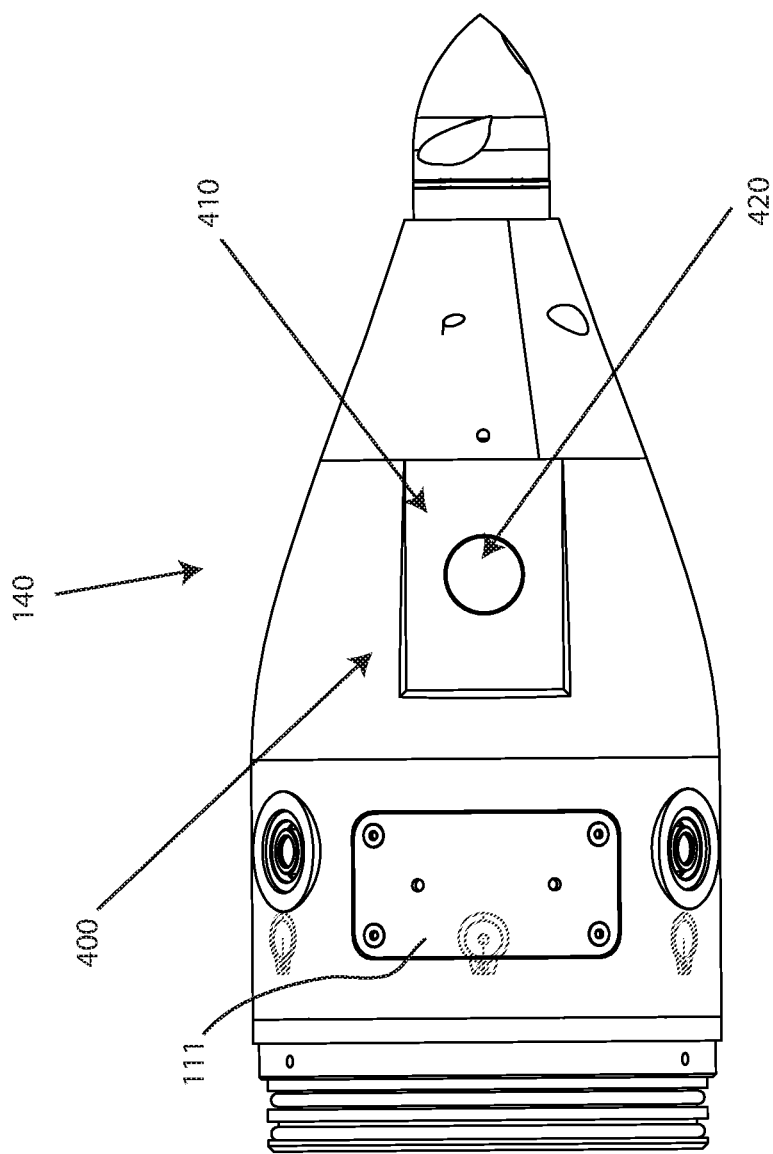
FIG. 12 depicts a bottom view of the UUV, showing a receiving area for a drop weight, in accordance with embodiments of the present invention.
Figure 13:
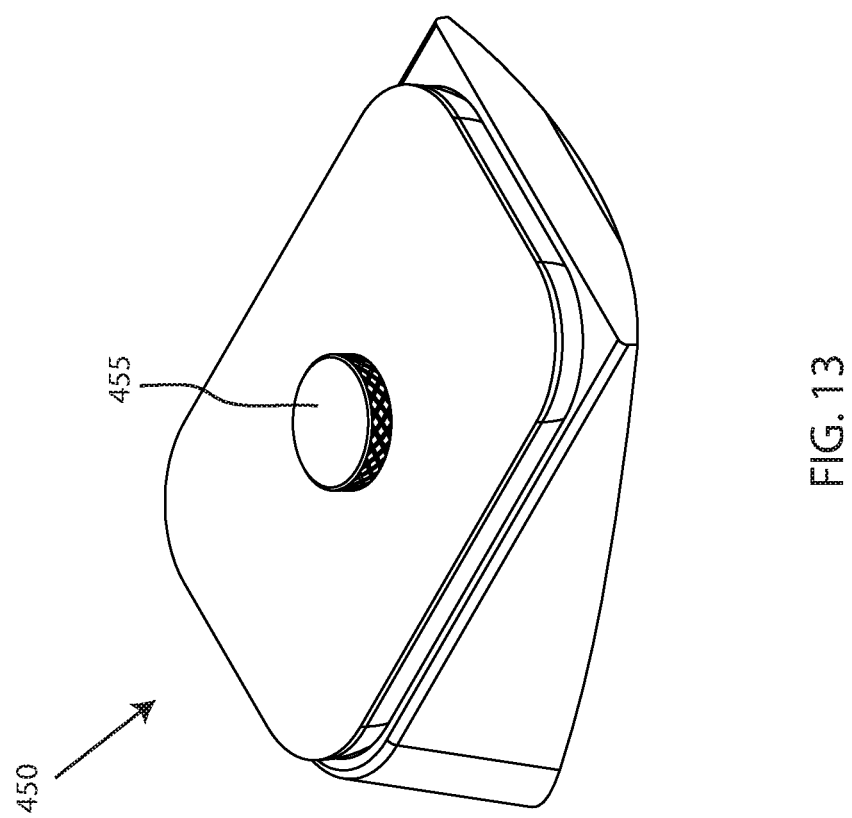
FIG. 13 depicts a perspective view of a drop weight, in accordance with embodiments of the present invention.
Figure 14:
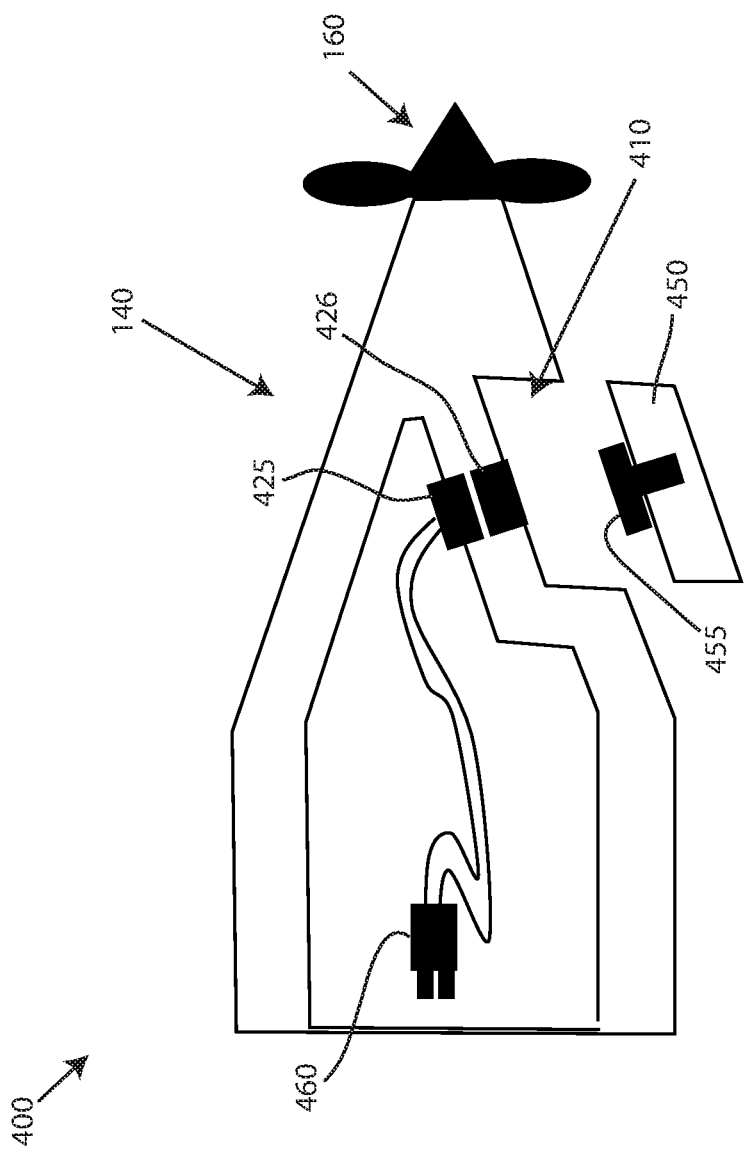
FIG. 14 depicts a schematic view of a reusable trigger mechanism, in accordance with embodiments of the present invention.

With continued reference to the drawings, FIGS. 12-14 depict embodiments of the UUV 100 having a reusable triggering mechanism 400 for a drop weight 450. Execution of proper ballasting may affect an operation of the UUV 100. As noted supra, a UUV must be ballasted to be neutral or slightly positive in the water, a characteristic which varies with the density of the water the vehicle is operating in. A function is included which, although maybe not directly associated with operational ballast and trim, is essential for a safe recovery of the UUV 100 in the event of an operational failure or emergency. The safe recovery function may involve the use of a releasable drop weight 450 which comprises a significant portion of the total ballast of the vehicle 100. In the event of a system failure or vehicle emergency, the drop weight 450 can be released by the vehicle 100 to make the vehicle 100 positively buoyant which will return the vehicle 100 to the surface for recovery, without other intervention.

In known drop weight techniques for UUV's, a drop weight is retained in the vehicle through a use of an electro-magnetically created magnetic force which is powered up at all times when the vehicle is operating, using precious battery power/resources. When the battery power is completely expended, the drop weight will automatically release, creating positive buoyancy and bring the vehicle to the surface.

Here, embodiments of the UUV 100 may include a reusable trigger mechanism 400 for a drop weight 450, proximate the tail portion 140, that applies power in the event of a failure or emergency. The trigger mechanism 400 may include a receiving area 410 configured to receive the drop weight 450. Embodiments of the receiving area 410 may be an opening, a cavity, a recessed area, and the like, which may be disposed on an underside of the UUV 100 proximate the tail portion 140. The receiving area 410 may be sized and dimensioned to correspond with the drop weight 450, so that the drop weight 450 can be disposed within the receiving area 410. Embodiments of the trigger mechanism 400 may also include a trigger magnet 420, which may be comprised of a permanent magnet and an electromagnet coupler 420, disposed within the hull 150 or otherwise securely attached to the UUV 100 proximate the receiving area 410. As shown in FIGS. 13-14, embodiments of the drop weight 450 may include a magnet 455. In an exemplary embodiment, the drop weight magnet 455 is covered in a housing. Embodiments of the drop weight magnet 455 may be magnetically attracted to the trigger permanent magnet 420. The drop weight magnet 455 may be threadably engaged with the drop weight 450. A threadable engagement of between the drop weight magnet 455 and the drop weight 450 may allow a user to thread the drop weight magnet 455 to increase or decrease a distance that the magnet 455 protrudes from the drop weight 450. The flexibility of the magnetic thumbscrew may allow adjustment for height to fit smoothly into the receiving area 410 and against the outer surface of the hull 150.

The drop weight 450 may be held into the vehicle 100 by the permanent magnet 426, which eliminates a need for power consumption normally required to hold the drop weight in the vehicle, thus increasing vehicle endurance. When a situation arises, such as a system failure or emergency, the vehicle 100 applies power to a solenoid magnet 425 positioned near the permanent magnet(s) 426, creating an opposing magnetic field which overcomes the permanent magnets, causing the drop weight to disengage and fall out the receiving area 410. Embodiments of the drop weight function may be accomplished through a proper placement of permanent magnets 426 in both the hull 150 and the drop weight 450 so that without an introduction of external magnetic field(s), the drop weight 450 may remain attached in the receiving area 410 in the hull 150 proximate the tail portion 140. A solenoid or connector 460 may be located in a proximity of the trigger magnet 420, so that when a current is passed through the solenoid, a counter magnetic field is created which overcomes the retaining force of the permanent magnetic 426, causing the drop weight 450 to drop free of the vehicle 100.

Moreover, the reusable trigger mechanism 400 comprising the trigger magnet 420 coupled to a solenoid connector 460, configured to retain the drop weight 450, may be reusable because the electromagnetic field applied to the trigger magnet 420 may not permanently destroy the trigger magnet 420, and may be reused when the power/signal is no longer applied to the trigger magnet 420. The reusability of the trigger mechanism 400 may be advantageous over known drop weight techniques that employ a wire which is rapidly corroded through the application of electrical current in an aqueous solution.

Figure 15:
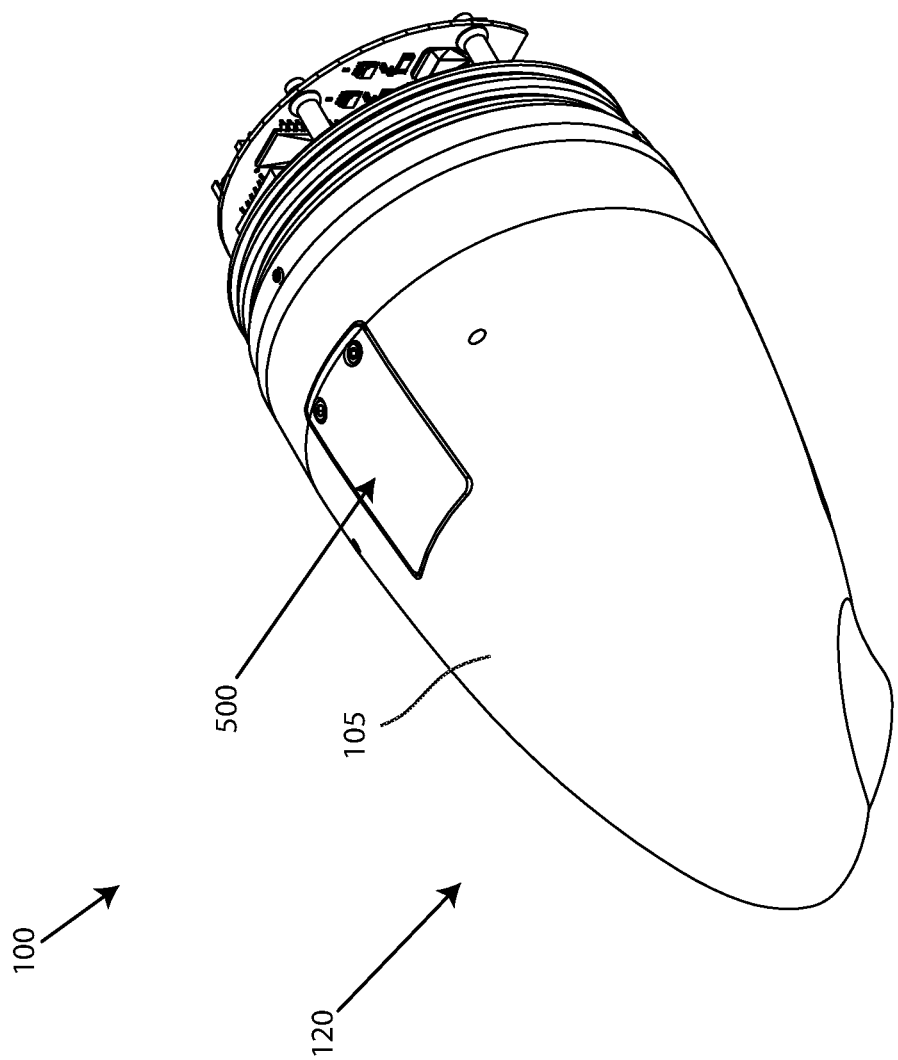
FIG. 15 depicts a perspective view of a nose portion of the UUV, having a display, in accordance with embodiments of the present invention.
Figure 16:
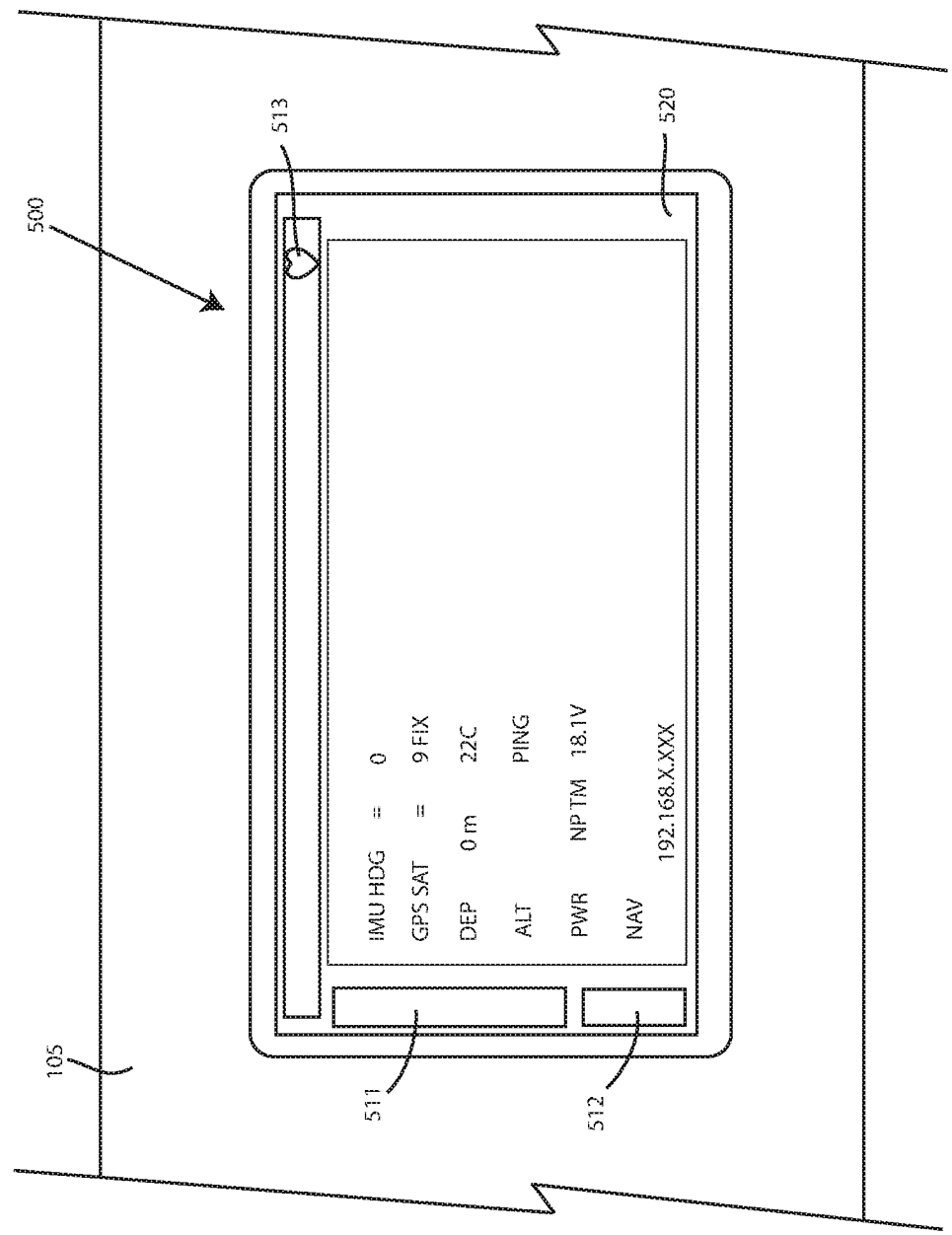
FIG. 16 depicts a display on an outer surface of the UUV, in accordance with embodiments of the present invention.

With reference now to FIGS. 14-16, embodiments of the UUV 100 may also include a visual display 500. Embodiments of the visual display 500 may be an OLED display located on an external surface 105 of the UUV 100. The display 500 may be integrated with the hull 150 of the UUV 100. The display 500 may be visible when looking at the UUV 100 from a distance, displaying one or more data and information. Underwater vehicles, while on deck or in the laboratory, may communicate with external controllers, usually by manually connected cable(s) between the vehicle and an external control computer or by WiFi or Bluetooth or other electro-magnetic (i.e. radio or wireless) link between the vehicle and an external control computer. If there is no external link between the vehicle and a control computer, or when the vehicle is communicating over WiFi to the external control computer, the OLED visual display 500 may provide a visual feedback on a vehicle status and relevant operational information to an operator to permit determination of proper function prior to launch of the vehicle. The OLED external display supplies much more information than blinking LED status indicators for operator feedback.

For instance, embodiments of the display 500 may utilize a full color OLED display to provide an operator with a detailed vehicle status upon start up, even without the use of an external control computer. A use of colors to provide visual feedback may include a blinking LED "heartbeat" showing the display is active, such as indicator 513, a status bar for a status of sensors and communications, such as indicator 512, and a display of vehicle IP address to facilitate WiFi communications, such as indicator 511. A different color may indicate a different status (e.g. green=active, red=error, gray=no information or status to report) for each of the indicators 511, 512, 513. Accordingly, an operator may glance at the display 500 to learn of valuable, vital, important, convenient, etc. system information without the need to connect to an external computer (or check the connected computer). A main display 520 of the OLED display 500 may display a plurality of data/information, such as values being received or obtained, by an onboard and/or remotely connected computing system, from an altimeter, a temperature sensor, a pressure sensor, a GPS unit, a battery module, a WiFi antenna, and the like.

Figure 17:
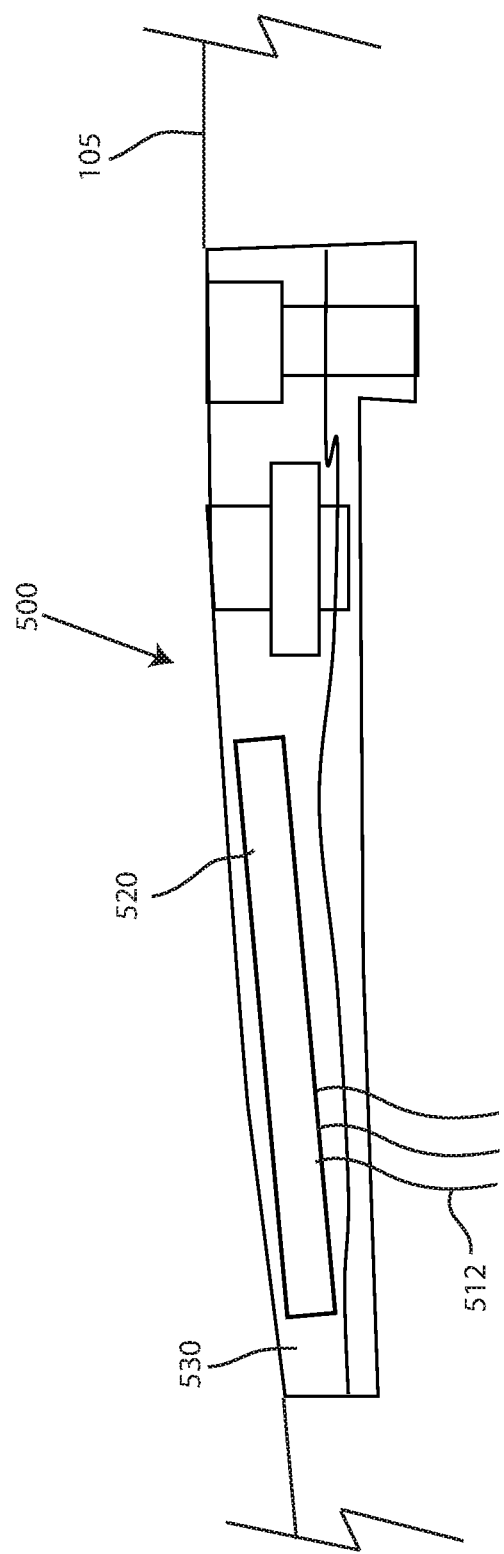
FIG. 17 depicts a schematic view of the display of the UUV, in accordance with embodiments of the present invention.

Furthermore, as shown in FIG. 17, specialized OLED electronics appropriate to drive the OLED display 500 utilizing inputs for the vehicle 100 and vehicle sensors may be sealed in a compliant potting 530 to keep water from the electronics. The potted display 520 may be connected to the vehicle internal electronics through two potted hull penetrators and secured in a specialty designed hull recess proximate the nose 120 for external viewing of the OLED face. An onboard vehicle control computer may be utilized to collect vehicle and sensor input and transmit the collected data to the OLED module for display.

Embodiments of UUV 100 may include some, all, or one of the features disclosed herein, in a single embodiment. For example, embodiments of the UUV 100 may include a control fin 200, one or more movable battery modules 305, 306 for adjusting ballast or trim or countering a roll of the UUV, a drop weight 400 and reusable triggering mechanism 400, and a display 500. Alternatively, embodiments of the UUV 100 may include various combinations of a control fin 200, one or more movable battery modules 305, 306 for adjusting ballast or trim or countering a roll of the UUV, a drop weight 400 and reusable triggering mechanism 400, and/or a display 500. Further embodiments of the UUV 100 may include a single one of a control fin 200, one or more movable battery modules 305, 306 for adjusting ballast or trim or countering a roll of the UUV, a drop weight 400 and reusable triggering mechanism 400, and a display 500.

Referring to FIGS. 1-17, a method may include the steps of eliminating a communication mast on an outer surface 105 of an unmanned underwater vehicle 100, and integrating communications and navigational hardware 260, 270, 280 into a control fin 200 of the UUV 100, so that the control fin 200 controls a travel direction of the UUV 100 and communicates with an external computing system. Furthermore, a method for adjusting a trim of an unmanned underwater vehicle 100 may include the steps of disposing one or more battery modules 305, 306 in an interior region 325 of a hull 150 of the UUV 100, and displacing at least one of the one or more battery modules 305, 306 to affect the trim of the UUV 100. A method for countering a roll of an unmanned underwater vehicle 100 may include the steps of disposing one or more battery modules 305, 306 in an interior region 325 of a hull 150 of the UUV 100, and rotating at least one of the one or more battery modules 305, 306 to counter the roll of the UUV 100.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. An unmanned underwater vehicle (UUV) comprising:
 a hull having a nose and a tail;
 a propulsion mechanism;
 a control fin, the control fin housing at least one antenna, wherein the control fin is configured to control a movement of the UUV and communicate external to the UUV, wherein the antenna is integrated within the control fin, and wherein wires extend from the hull to the fin through a shaft of an actuator; and
 one or more movable battery modules disposed within an interior region of the hull having a plurality of grooves along an inner surface of the hull, the plurality of grooves accommodating a retaining ring for retaining the one or more movable battery modules in an axial position within the hull, wherein one or more battery modules include a groove that receives a portion of the retaining ring to secure the one or more movable battery modules in the axial position, and wherein displacement of the one or more battery modules in the axial direction within the hull affects a trim of the UUV.

2. The UUV of claim 1, wherein the at least one antenna includes a GPS antenna and a WiFi antenna.

3. The UUV of claim 1, wherein the control fin is a dorsal fin, extending vertically upward from an outer surface of the hull.

4. The UUV of claim 1, wherein a recovery LED strobe light is disposed within the control fin.

5. The UUV of claim 1, wherein the control fin is moveable by a servo actuator to affect a travel direction of the UUV while traveling underwater.

6. The UUV of claim 1, further comprising communications and navigational hardware integrated in the control fin.

7. An unmanned underwater vehicle (UUV) comprising:
a hull having a nose portion and a tail portion;
a propulsion mechanism; and
one or more movable battery modules disposed within an interior region of the hull, further comprising a plurality of grooves along an inner surface of the hull, the plurality of grooves accommodating a retaining ring for retaining the one or more movable battery modules in an axial position within the hull,
wherein one or more battery modules include a groove that receives a portion of the retaining ring to secure the one or more movable battery modules in the axial position, and
wherein displacement of the one or more battery modules in the axial direction within the hull affects a trim of the UUV.

8. The UUV of claim 7, wherein the nose portion and the tail portion are removably secured to a central body portion of the hull, such that removal of the nose portion or the tail portion provides access to the interior region of the hull to manually displace the one or more battery modules to affect the trim of the UUV.

9. The UUV of claim 7, wherein the battery modules are comprised of a plurality of individual battery cells, wherein removing one or more individual battery cells from the one or more battery modules reduces a weight of the one or more battery modules, which affects a ballast of the UUV, and changes a center of mass of the UUV.

10. An unmanned underwater vehicle (UUV) comprising:
a hull having a nose portion and a tail portion;
a propulsion mechanism; and
one or more movable battery modules disposed within an interior region of the hull, further comprising a plurality of grooves along an inner surface of the hull, the plurality of grooves accommodating a retaining ring for retaining the one or more movable battery modules in an axial position within the hull, and the one or more battery modules include a groove that receives a portion of the retaining ring to secure the one or more movable battery modules in the axial position, and wherein displacement of the one or more battery modules in the axial direction within the hull affects a trim of the UUV,
wherein rotation of the one or more battery modules counters a tendency for the UUV to roll, in response to an offset to a balance of the UUV,
where the battery modules are rotated to place a center of gravity below a rotational center of the battery module.

11. The UUV of claim 10, wherein the rotation in a first direction or a second direction changes a center of gravity of the one or more battery modules, to counter the tendency for the UUV to roll.

12. The UUV of claim 10, wherein removing one or more individual battery cells from the one or more battery modules reduces a weight of the one or more battery modules, which induces a counter roll of the UUV.

13. An unmanned underwater vehicle (UUV) comprising:
a hull having a nose and a tail;
a propulsion mechanism;
a control fin having at least one antenna internally integrated within the control fin,
wherein the control fin is configured to control a movement of the UUV and communicate external to the UUV, wherein wires extend from the hull to the fin through a shaft of an actuator;
a visual display, integrated in the hull proximate the nose, wherein the visual display displays information to provide an operator of the UUV with a detailed vehicle status upon start up, without a use of an external control computer; and
one or more movable battery modules disposed within an interior region of the hull having a plurality of grooves along an inner surface of the hull, the plurality of grooves accommodating a retaining ring for retaining the one or more movable battery modules in an axial position within the hull, wherein one or more battery modules include a groove that receives a portion of the retaining ring to secure the one or more movable battery modules in the axial position, and wherein displacement of the one or more battery modules in the axial direction within the hull affects a trim of the UUV.

14. The UUV of claim 13, wherein the information is displayed via a plurality of indicators, further wherein a status reported by the plurality of indicators is color coded.

15. The UUV of claim 13, wherein the UUV has a total body length of five feet or less, and wherein the UUV is capable of performing operations underwater at a depth of 100 feet or more.

16. The UUV of claim 13, further comprising: a reusable trigger mechanism disposed on an underside of the nose, the reusable trigger mechanism having a trigger magnet, a drop weight magnetically attached to the trigger magnetic, the drop weight including a drop weight magnet magnetically attracted to the trigger magnet, wherein, in response to an event, a power is applied to the trigger magnet to create an opposing magnetic field which overcomes the magnetic attraction between the trigger magnet and the drop weight magnet, causing the drop weight to disengage from the UUV, so that the UUV immediately begins to surface.

* * * * *